US012335543B2

(12) United States Patent
Yuan (10) Patent No.: US 12,335,543 B2
(45) Date of Patent: Jun. 17, 2025

(54) SYSTEM AND METHOD FOR END-TO-END SIDE-BY-SIDE IMAGE PROCESSING

(71) Applicant: Acer Incorporated, New Taipei (TW)

(72) Inventor: Chia-Shang Yuan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 74 days.

(21) Appl. No.: 18/512,498

(22) Filed: Nov. 17, 2023

(65) Prior Publication Data

US 2025/0119600 A1  Apr. 10, 2025

(30) Foreign Application Priority Data

Oct. 6, 2023  (TW) .................. 112138413

(51) Int. Cl.
*H04N 21/23* (2011.01)
*G11B 27/02* (2006.01)
*H04N 21/234* (2011.01)
*H04N 21/2343* (2011.01)

(52) U.S. Cl.
CPC ..... *H04N 21/234327* (2013.01); *G11B 27/02* (2013.01); *H04N 21/23424* (2013.01)

(58) Field of Classification Search
USPC ........................................ 386/280
See application file for complete search history.

(56) References Cited

U.S. PATENT DOCUMENTS

| 2019/0079715 A1* | 3/2019 | Kiyose | ................. | G06F 3/1252 |
| 2019/0087137 A1* | 3/2019 | Yasui | ................. | G06F 3/1243 |
| 2019/0233543 A1* | 8/2019 | Agrawal | ............ | C07K 16/2869 |

* cited by examiner

*Primary Examiner* — Nigar Chowdhury
(74) *Attorney, Agent, or Firm* — McClure, Qualey & Rodack, LLP (57) ABSTRACT

Provided is a method for end-to-end side-by-side image processing that adaptively designs dedicated information frames for various video streaming applications. These information frames are embedded into the video transmitted by video streaming applications, allowing viewing devices to restore the original 3D effects without modifying the behavior of the video streaming applications themselves.

10 Claims, 5 Drawing Sheets

SYSTEM AND METHOD FOR END-TO-END SIDE-BY-SIDE IMAGE PROCESSING

CROSS REFERENCE TO RELATED APPLICATIONS

This application claims priority of Taiwan Patent Application No. 112138413, filed on Oct. 6, 2023, the entirety of which is incorporated by reference herein.

BACKGROUND OF THE INVENTION

Field of the Invention

The present disclosure relates in general to image processing techniques, and it relates in particular to a system and method for end-to-end side-by-side image processing.

Description of the Related Art

Side-by-side images are a form of 3D imaging technique, composed of two aligned images placed side by side. These two images simulate the views seen by the viewer's left and right eyes, which appear similar but possess slight differences. These differences, when integrated and processed by the brain, enable the viewer to perceive a 3D effect.

With the advancement of internet technology leading to faster network speeds, various video streaming applications, such as video conferencing software like Zoom, Microsoft Teams, and Google Meet, as well as live-streaming software such as Twitch, YouTube Live, and Open Broadcaster Software (OBS), have become increasingly popular. When the transmitter of a video, for instance, selects side-by-side images as input for these video streaming applications (e.g., using a 3D camera in the side-by-side image format as the input source), the video streaming application performs certain editing tasks on the side-by-side images, including resizing, cropping, and adding user interface elements such as toolbars, function buttons, drop-down menus, and small windows. These actions often lead to the disruption of the originally expected 3D effect in the side-by-side images, significantly impacting the user's viewing experience.

For manufacturers of computer devices, their customers want to experience autostereoscopic 3D content without the need for additional equipment. However, the aforementioned video streaming applications were developed by third parties, making it impossible for the manufacturers of computer devices to address the aforementioned issue by modifying the behavior of the video streaming applications themselves.

Consequently, it would be desirable to have an end-to-end solution for side-by-side image processing that can address the issue of the 3D effect in side-by-side images being disrupted by video streaming applications without modifying the behavior of the video streaming applications themselves.

BRIEF SUMMARY OF THE INVENTION

Embodiments of the present disclosure provide a system for end-to-end side-by-side image processing. The system includes the first computer device and the second computer device. The first computer device runs a video streaming application and the first program. The second computer device runs the video streaming application and the second program. The video streaming application causes the first computer device to transmit a video via a network to the second computer device and causes the second computer device to generate an edited image sequence based on the video. The first program causes the first computer device to obtain a side-by-side image sequence. The first program further causes the first computer device to determine position-and-range information of a non-side-by-side area in the edited image sequence in accordance with the video streaming application, and to generate an information frame based on the determined position-and-range information and the first side-by-side image in the side-by-side image sequence. The generated information frame includes a header section and a corresponding specified image block. The header section contains the position-and-range information. The generated information frame is included in the video transmitted by the first computer device. The second program causes the second computer device to parse the information frame to obtain the specified image block and the position-and-range information. The second program further causes the second computer device to replace the non-side-by-side area in each edited image in the edited image sequence with the specified image block to generate an output image sequence. The second computer device displays the output image sequence on a display.

In an embodiment, the first program further causes the first computer device to represent the position-and-range information in the header section using an arrangement of image blocks in multiple colors, with each color representing a specific numerical value.

In an embodiment, the first program further causes the first computer device to generate the specified image block based on the first side-by-side image, in accordance with a scaling factor determined by the video streaming application.

In an embodiment, the first computer device obtains the side-by-side image sequence from a 3D camera.

In an embodiment, the first computer device further runs the third program which causes the first computer device to generate the side-by-side image sequence based on a 2D image sequence.

Embodiments of the present disclosure further provide a method for end-to-end side-by-side image processing. The method is implemented by the first computer device and the second computer device. The first computer device and the second computer device run a video streaming application. The video streaming application causes the first computer device to transmit a video via a network to the second computer device, and causes the second computer device to generate an edited image sequence based on the video. The method includes the first computer device obtaining a side-by-side image sequence. The method further includes the first computer device determining the position-and-range information of a non-side-by-side area in the edited image sequence in accordance with the video streaming application, and generating an information frame based on the determined position-and-range information and the first side-by-side image in the side-by-side image sequence. The information frame includes a header section and a corresponding specified image block. The header section contains the position-and-range information. The information frame is included in the video transmitted by the first computer device. The method further includes the second computer device parsing the information frame to obtain the specified image block and the position-and-range information. The method further includes the second computer device replacing the non-side-by-side area in each edited image in the edited image sequence with the specified image block to generate an output image sequence. The method further includes the step of displaying the output image sequence on a display.

The disclosed system and method for end-to-end side-by-side image processing provided herein achieve the restoration of the original 3D effect that has been disrupted by video streaming applications. This is accomplished by adaptively designing dedicated information frames for various video streaming applications and embedding them in the video transmitted by these applications. Notably, this restoration is achieved without modifying the behavior of the video streaming applications themselves. Consequently, the functionality of autostereoscopic display on computer devices is enhanced within a variety of video streaming applications.

BRIEF DESCRIPTION OF THE DRAWINGS

The present disclosure can be more fully understood by reading the subsequent detailed description and examples with references made to the accompanying drawings. Additionally, it should be appreciated that in the flow diagram of the present disclosure, the order of execution for each block can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

Ordinal terms used in the claims, such as "first," "second," "third," etc., are only for convenience of explanation, and do not imply any precedence relation between one another.

The descriptions of embodiments for devices or systems provided below are also applicable to embodiments of methods, and vice versa.

Figure 1:
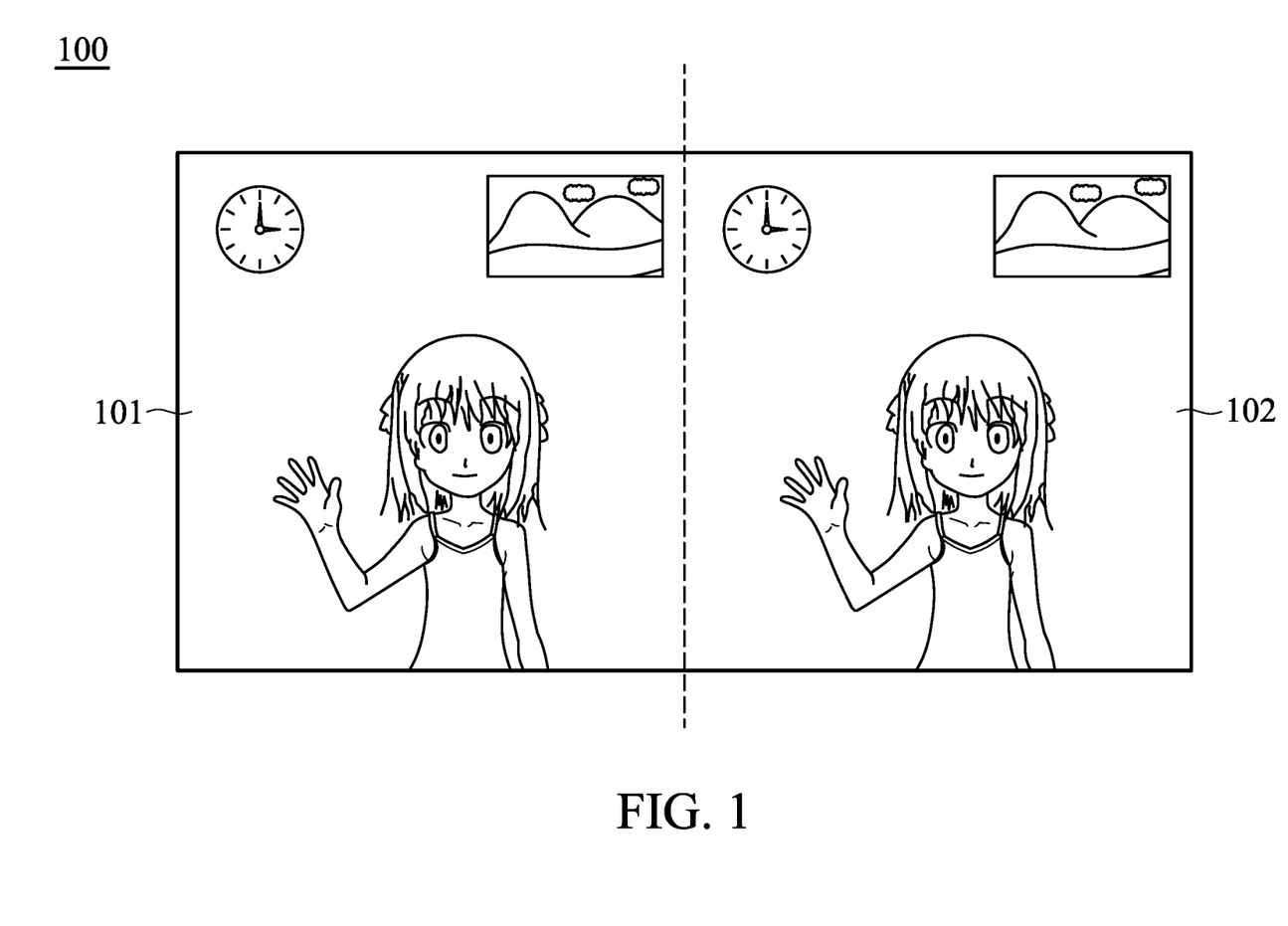
FIG. 1 presents an example of a side-by-side image.

FIG. 1 presents an example of a side-by-side image 100, in which the left image 101 and the right image 102 simulate the views seen by the viewer's left and right eyes, respectively. As shown in FIG. 1, the side-by-side image 100 appears symmetrical, but in reality, there are slight differences between the left image 101 and the right image 102. These differences, after being integrated and processed by the brain, enable the viewer to perceive a 3D effect.

It should be noted that the dashed line in FIG. 1 is solely used to distinguish the left image 101 from the right image 102 and to clarify the concept of the side-by-side image 100. In reality, this dashed line does not exist in the side-by-side image 100.

When the transmitter uses the side-by-side image 100 as the target for a video streaming application, the video streaming application performs certain editing tasks on the side-by-side image 100 including resizing, cropping, and adding user interface elements such as toolbars, function buttons, drop-down menus, and small windows before displaying the output at the viewer's device. In this document, the images output by the video streaming application are referred to as "edited images."

Figure 2:
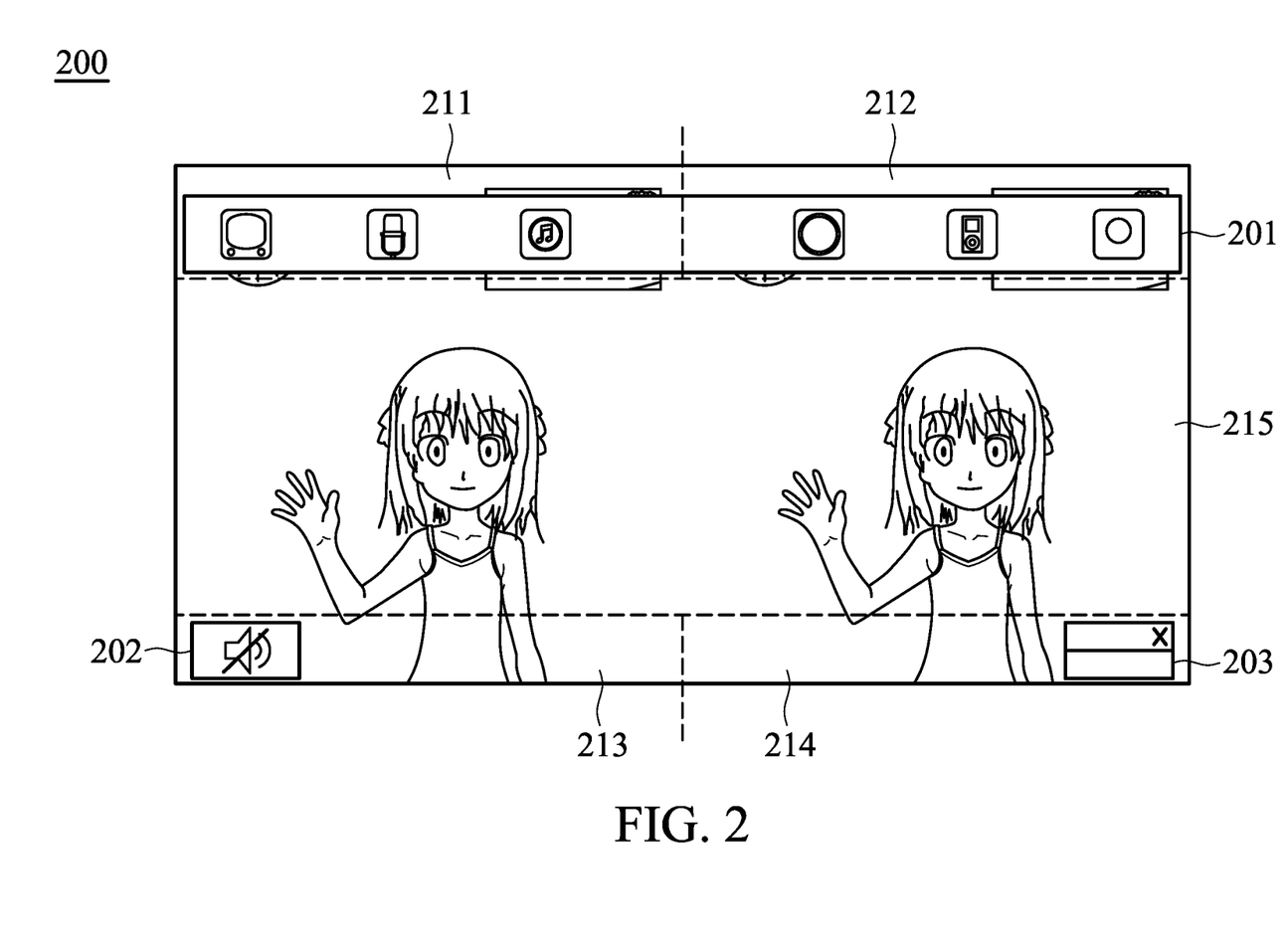
FIG. 2 presents an example of an edited image.

FIG. 2 presents an example of an edited image 200. As shown in FIG. 2, the edited image 200 is no longer nearly symmetrical like the side-by-side image 100, because the video streaming application has added a toolbar 201, a function button 202, and a small window 203 to it. More specifically, the toolbar 201 spans the area 211 within the left half and the area 212 within the right half of the edited image, making areas 211 and 212 notably asymmetrical. The function button 202 is located in the area 213 within the left half of the edited image, making the area 213 asymmetry with its corresponding mapped area (note: not necessarily area 214) on the right. The small window 203 is located in the area 214 within the right half of the edited image, making the area 214 asymmetry with its corresponding mapped area on the left (note: not necessarily area 213). As a result, only the area 215 in the edited image 200 is side-by-side, while areas 211-214 are not side-by-side. Therefore, this document refers to area 215 as the "side-by-side area" and areas 211-214 as the "non-side-by-side areas."

It should be noted that the dashed lines in FIG. 2 are solely used to distinguish each of the non-side-by-side areas 211-214 and the side-by-side area 215 and to clarify the concept of the edited image 200. In reality, these dashed lines do not exist within the edited image 200.

It should be appreciated that FIG. 2 provides just one example of an edited image, and it is not limiting. Different video streaming applications will have different user interface designs, and, as a result, the distribution of non-side-by-side areas in edited images may vary. However, in general, video streaming applications tend to place user interface elements towards the periphery of the edited image. Consequently, non-side-by-side areas are typically located near the edges of the edited image. Non-side-by-side areas are often defined by rectangles, though the present disclosure is not limited thereto.

Furthermore, in addition to the inclusion of user interface elements in the non-side-by-side area that distinctly asymmetrize the edited image 200, the position and range of the non-side-by-side area are not strictly limited by the present disclosure. For instance, the upper edge of the non-side-by-side area 213 can be situated above the upper edge of the function button 202 by 1 row, 3 rows, 5 rows, 10 rows, or any reasonable range of additional rows of pixels, but the present disclosure is not limited thereto.

Due to the presence of non-side-by-side areas 211-214 in the edited image 200, it no longer possesses the 3D effect originally provided by the side-by-side image 100. However, for manufacturers of computer devices, video streaming applications are developed by third parties, making it impossible to modify the behavior of the video streaming applications themselves. Therefore, they can only restore the expected 3D effect by manipulating the input and output of the video streaming application. A straightforward solution is to remove the non-side-by-side areas 211-214 from the edited image 200, leaving only the side-by-side area 215 for output or scaling the side-by-side area 215 to an appropriate display ratio before output. This approach indeed yields a side-by-side image with a 3D effect, but it reduces the field of view (FoV) compared to the original side-by-side image 100. For example, background and objects (such as the clock and landscape painting shown in FIG. 1) obscured by the toolbar 201 cannot be fully displayed.

The method for end-to-end side-by-side image processing disclosed herein is designed to enable the video streaming application to carry the information required to restore the 3D effect in the transmitted video. This information includes the position-and-range information of the non-side-by-side areas 211-214 and the specified image blocks for replacing them. As this information needs to undergo processing and transmission by the video streaming application, it must be encapsulated in a data format compatible with the video streaming application, which is a video frame. To distinguish the concepts, this document refers to video frames that carry the specified image blocks and position-and-range information as "information frames" and video frames that transmit side-by-side images as "image frames." However, it should be noted that information frames are inherently also video frames, but in this document, information frames are defined as images used to convey the information required to restore the 3D effect, rather than images presented to viewers.

Figure 3:
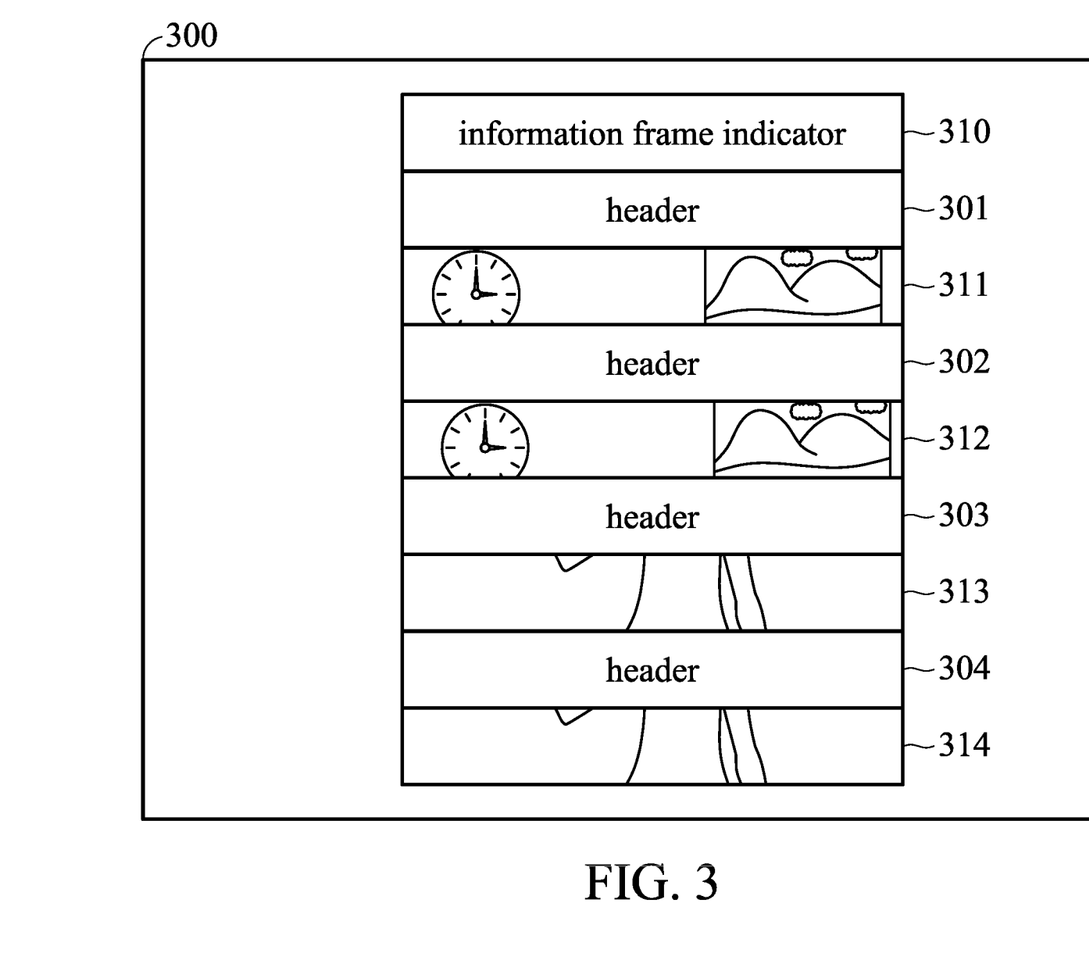
FIG. 3 illustrates an example of an information frame, according to an embodiment of the present disclosure.

FIG. 3 illustrates an example of an information frame 300, according to an embodiment of the present disclosure. As shown in FIG. 3, the information frame 300 may include an information frame indicator 310, header sections 301-304, and specified image blocks 311-314.

The information frame indicator 310 is used for indicating that the frame 300 is an information frame. Since the information frame 300 is carried within video, which is a sequence of video frames, and the vast majority of video frames are image frames, the presence of the information frame indicator 310 facilitates the viewer's device to identify information frames from the video frame sequence for parsing and obtaining the contained information.

Header sections 301-304 correspond to the non-side-by-side areas 211-214 in FIG. 2 and each contain the position-and-range information of the non-side-by-side areas 211-214. Position-and-range information can be represented in various forms, and the present disclosure is not limited thereto. In an embodiment, the position-and-range information can be represented by the relative position of the top-left vertex of the non-side-by-side area in the edited image 200, along with the relative position of the bottom-right vertex of the non-side-by-side area. For example, using the top-left vertex of the edited image 200 as a reference, the position-and-range information can be represented by the coordinates of the top-left vertex of the non-side-by-side area ($x_1^{th}$ row of pixels, $y_1$th column of pixels) along with the coordinates of the bottom-right vertex ($x_2^{th}$ row of pixels, $y_2^{th}$ row of pixels). In another embodiment, the position-and-range information can be represented by the relative position of any vertex or center point of the non-side-by-side area in the edited image 200, along with the length and width of the non-side-by-side area. For example, using the top-left vertex of the edited image 200 as a reference, the position-and-range information can be represented by the coordinates of the top-left vertex of the non-side-by-side area ($x_1^{th}$ row of pixels, $y_1^{th}$ column of pixels), coordinates of the bottom-right vertex ($x_2^{nd}$ row of pixels, $y_2^{nd}$ column of pixels), coordinates of the top-right vertex, coordinates of the bottom-right vertex, or the center point coordinates, along with the length L in pixels and width W in pixels of the non-side-by-side area.

It should also be appreciated that while the position and range of the non-side-by-side area depend on the user interface design of the video streaming application, video streaming applications typically do not actively provide this information to other programs. Fortunately, for video streaming applications, the position of user interface elements in the window is usually fixed. Therefore, developers can adaptively design information frames tailored to various video streaming applications by observing the user interface designs of different video streaming applications.

The specified image blocks 311-314 correspond to the header regions 301-304, respectively, and are used to replace the non-side-by-side areas 211-214, respectively. The specified image blocks 311-314 can be obtained by scaling the image blocks corresponding to the non-side-by-side areas 211-214 of the side-by-side image 100. After receiving and parsing the information frame 300, the viewer's device can obtain the specified image blocks 311-314 as well as the position-and-range information of the non-side-by-side areas 211-214. Subsequently, the non-side-by-side areas 211-214 in the edited image 200 can be replaced with the specified image blocks 311-314, generating an output image with side-by-side 3D effects.

Figure 4:
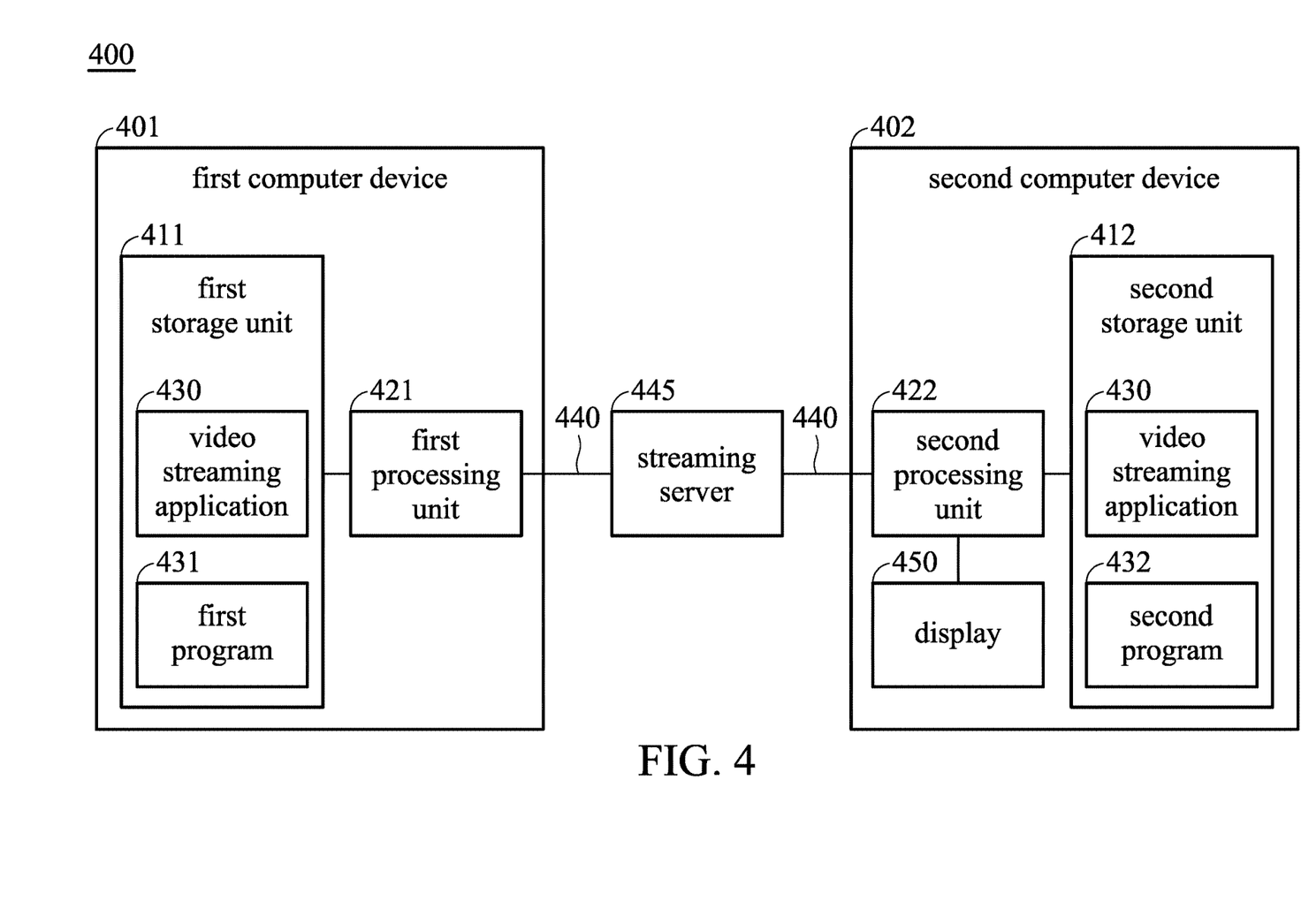
FIG. 4 illustrates a system block diagram of a system for end-to-end side-by-side image processing, according to an embodiment of the present disclosure.

FIG. 4 illustrates a system block diagram of a system 400 for end-to-end side-by-side image processing, according to an embodiment of the present disclosure. As shown in FIG. 4, the image processing system 400 includes a first computer device 401 and a second computer device 402, representing the transmitting and viewing devices, respectively. The first computer device 401 transmits video via a network 440 to the second computer device 402, probably through a streaming server 445. The first computer device 401 includes a first storage unit 411 and a first processing unit 421. The second computer device 402 includes a second storage unit 412, a second processing unit 422, and a display 450.

The first computer device 401 and the second computer device 402 can each be electronic devices capable of performing computational tasks, such as personal computers like desktops or laptops, or mobile devices like tablet computers and smartphones, but the present disclosure is not limited thereto.

The first storage unit 411 and the second storage unit 412 can each be storage devices containing non-volatile memory, such as hard drives, solid-state drives (SSD), flash memory, or read-only memory, but the present disclosure is not limited thereto.

The first processing unit 421 and the second processing unit 422 can each include one or more general-purpose or dedicated processors and the combinations thereof for executing instructions. These processors may include, for example, central processing units (CPUs), graphics processing units (GPUs), digital signal processors (DSPs), neural network processors (NNPs), or various other types of processors the combinations thereof, but the present disclosure is not limited thereto.

According to an embodiment of the present disclosure, the first storage unit 411 stores a video streaming application 430 and a first program 431, while the second storage unit stores a video streaming application 430 and a second program 432. The first program 431 and the second program 432 contain multiple instructions corresponding to the method for side-by-side image processing of the present disclosure. When the first processing unit 421 reads and executes the first program 431 from the first storage unit 411, it performs the steps of the method for side-by-side image processing on the first computer device 401 (i.e., the transmitting side). Similarly, when the second processing unit 422 reads and executes the second program 432 from the second storage unit 412, it performs the steps of the method for side-by-side image processing on the second computer device 402 (i.e., the viewing side).

The video streaming application 430 can be any application involving video streaming, such as video conferencing software like Zoom, Microsoft Teams, and Google Meet, or live streaming software like Twitch, YouTube Live, and Open Broadcaster Software (OBS), but the present disclosure is not limited thereto. The video streaming application 430 performs certain edits on the side-by-side image, including scaling, cropping, and adding user interface elements such as toolbars, function buttons, drop-down menus, and pop-up windows. However, the user interface design of the video streaming application 430 itself is not limited by the present disclosure.

The streaming server 445 can be a dedicated server for the video streaming application 430, responsible for encoding, compressing, and transmitting video from the first computer device 401 to the second computer device 402 or other recipients. Depending on the system architecture design of the video streaming application 430, the editing operations on the side-by-side image can be partially or entirely executed in any combination of the first computer device 401, the second computer device 402, and the streaming server 445, but the present disclosure is not limited thereto.

It should be appreciated that although the same symbol 430 is used in FIG. 4 to represent the video streaming application running on both the first computer device 401 and the second computer device 402, this merely indicates compatibility and does not mean they have to be the exact same software program. For example, the video streaming application 430 running on the first computer device 401 and the second computer device 402 can be from the same manufacturer and part of the same product, although their program versions (e.g., new version/old version, host/client) may differ. Alternatively, they can be accessed with different roles (e.g., broadcaster/viewer), enabling different feature modules.

The display 450 is a display device that can present the 3D effect of the side-by-side images to the viewer without the need for wearable devices (such as 3D/VR glasses or headgears). In an embodiment, the display 450 may include a display controller and a display panel (though not shown in the figure). The display controller is configured to switch the display mode of the display panel according to the display mode control signals from the second processing unit 422, allowing the viewer to switch between 2D mode and 3D mode, for example. The display panel can be implemented using any known stereoscopic imaging technology, such as parallax barrier, lenticular lenses, directional backlight, integral imaging, etc., but the present disclosure is not limited thereto.

While in the embodiment illustrated in FIG. 4, the display 450 is included within the second computer device 402, but the present disclosure is not limited thereto. In other embodiments, the second computer device 402 can allow the output image to be displayed on an external monitor.

Figure 5:
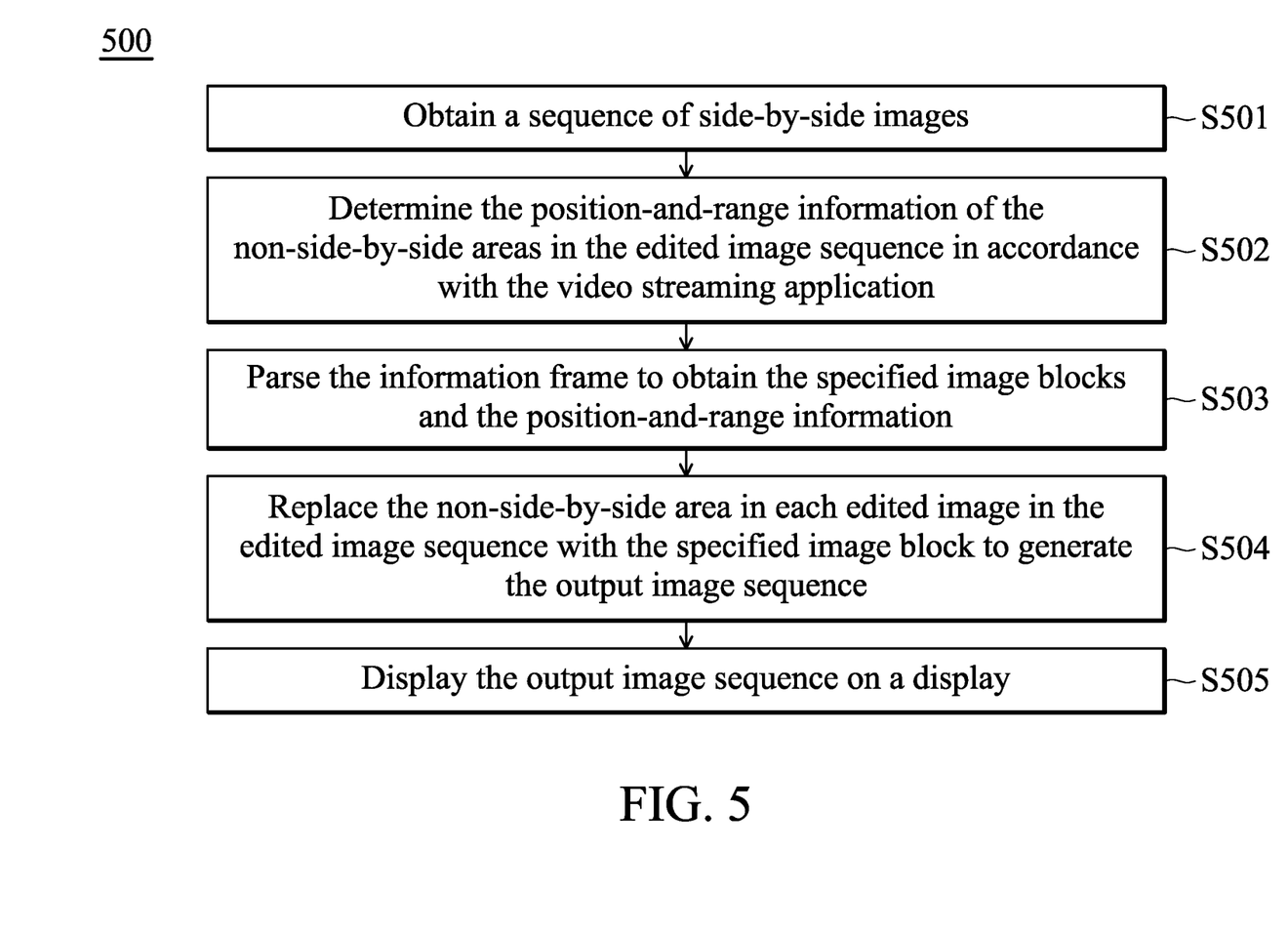
FIG. 5 illustrates a flow diagram of an end-to-end method for side-by-side image processing, according to an embodiment of the present disclosure.

FIG. 5 illustrates a flow diagram of an end-to-end method for side-by-side image processing 500, according to an embodiment of the present disclosure. As shown in FIG. 5, the method 500 may include steps S501-S505. Steps S501-S502 are executed by the first computer device 401 (specifically, the first processing unit 421) under the operation of the first program 431, and steps S503-S505 are steps executed by the second computer device 402 (specifically, the second processing unit 422) under the operation of the second program 432.

In step S501, a sequence of side-by-side images is obtained. For example, this sequence could include the side-by-side image 100 from FIG. 1 and a continuous stream of subsequent side-by-side images. In this document, this sequence of side-by-side images is also referred to as the "side-by-side image sequence."

In an embodiment, the first computer device 401 in FIG. 4 may further include or be connected to a 3D camera (though not shown in the figure) to obtain the side-by-side image sequence. The 3D camera can include lenses and a processor. The lenses may consist of one or more optical elements, including concave lenses, convex lenses, or various other lens configurations, for capturing images of the scenes and objects in the environment. The processor can run firmware to perform various optimizations on the images captured by the lenses, including noise reduction, color correction, contrast adjustment, etc., (but the present disclosure is not limited thereto) and generate side-by-side images based on the optimized images.

In an embodiment, the first storage unit depicted in FIG. 4 may also store a third program (though not shown in the figure). When the first processing unit 421 runs the third program, the third program causes the first processing unit 421 to generate the side-by-side image sequence based on a 2D image sequence. The third program can be a module or plugin of 3D visual applications associated with virtual reality (VR) or augmented reality (AR), such as games, video players, distance learning software, virtual labs, etc. Alternatively, the third program can be a standalone program for generating 3D side-by-side images based on 2D images, but the present disclosure is not limited thereto. The third program may involve well-known 3D imaging techniques such as virtual camera system, convolutional neural network (CNN), depth information extraction, 3D projection, etc., but the present disclosure is not limited thereto.

In step S502, the position-and-range information of the non-side-by-side areas in the edited image sequence is determined in accordance with the video streaming application, and an information frame is generated based on the first side-by-side image in the side-by-side image sequence. For example, the first processing unit 421 determines the position-and-range information of each of the non-side-by-side areas 211-214 in the edited image 200 in accordance with the video streaming application 430, and generates the information frame 300 based on the side-by-side image 100 in the side-by-side image sequence. As described earlier, the generated information frame 300 includes header sections 301-304, each containing position-and-range information for their respective specified image blocks 311-314. Additionally, the generated information frame 300 is included in the video transmitted by the first computer device 401 to the second computer device 402.

In an embodiment, step S502 involves generating the specified image blocks based on the first side-by-side image, in accordance with a scaling factor determined by the video streaming application. For example, if the video streaming application 430 scales the length and width of the side-by-side image sequence by factors ($\alpha$, $\beta$), then the second processing unit 422 scales the length and width of the image blocks corresponding to the non-side-by-side areas 211-214 in the side-by-side image 100 by the same factors ($\alpha$, $\beta$) to generate specified image blocks 311-314.

In step S503, the information frame is parsed to obtain the specified image blocks and the position-and-range information. For example, the second processing unit 422 parses the information frame 300 to obtain the specified image blocks 311-314 and their respective position-and-range information.

In general, the header section of an image typically uses text, numbers, or their combination to represent information for identifying the image's attributes. Therefore, the header section of the information frame can also use such a format to represent position-and-range information. However, for certain video streaming applications, their specific encoding and compression processes may lead to the custom text and numeric information in the header section having distortions when parsed in step S503 compared to when generated in step S502. Therefore, in an embodiment, step S502 may use an image format in the header section that is most compatible with the video streaming application and least likely to cause information distortion. Specifically, an arrangement of multiple colors of image blocks can be used to represent position-and-range information, where each color represents a specific numeric value. The number of color varieties depends on the numeral system used. For example, binary data is represented using two colors (e.g., black and white) to represent 0 and 1, octal data uses eight colors (e.g., red, orange, yellow, green, blue, indigo, purple, white) to represent 0-7, and hexadecimal data uses sixteen colors to represent 0, 1, 2, 3, 4, 5, 6, 7, 8, 9, A, B, C, D, E, F.

An example of using an arrangement of image blocks with eight different colors (i.e., octal encoding) in the header to represent position and range information is shown in in the following <Table 1>.

TABLE I

| W | R | G | V | W | B | O | V | W | R | Y | B | O | I | G | Y |
|---|---|---|---|---|---|---|---|---|---|---|---|---|---|---|---|

Each column in <Table 1> represents an image block in the header section. The English letters R, O, Y, G, B, I, V, W represent red, orange, yellow, green, blue, indigo, violet, and white, respectively. These colors are mapped to the numbers 0-7. Therefore, the arrangement of the image blocks in <Table 1> "WRGVWBOVWRYBOIGY" denotes the sequence of numbers "7036741670241532."

Similarly, the information frame indicator 310 shown in FIG. 3 can also be represented in a manner similar to <Table 1>, but the present disclosure is not limited thereto.

Referring back to FIG. 5, in step S504, the non-side-by-side area in each edited image in the edited image sequence is replaced with the specified image block to generate the output image sequence. For example, the second processing unit 422 respectively replaces the non-side-by-side areas 211-214 in the edited image 200 with the specified image blocks 311-314 to generate the output image. The same operation is carried out on subsequent edited images to generate the output image sequence. The resulting output image sequence will possess the 3D effect provided by the stereoscopic images.

In step S505, the output image sequence is displayed on a display, such as the display 450 shown in FIG. 4.

In an embodiment, the steps S502 to S504 can be executed at regular intervals to update the information frame and, consequently, the specified image blocks used to replace the non-side-by-side areas. The frequency of these timed executions can be set at intervals such as every 1 second, 2 seconds, 3 seconds, 5 seconds, or any suitable interval within a reasonable range, but the present disclosure is not limited thereto. For example, if the frame rate of the output images is 24 frames per second (fps), executing steps S502 to S504 once per second can result in updated specified image blocks 311-314 to replace the non-side-by-side areas 211-214 in the edited image 200 and its subsequent 23 frames.

The disclosed system and method for end-to-end side-by-side image processing provided herein achieve the restoration of the original 3D effect that has been disrupted by video streaming applications. This is accomplished by adaptively designing dedicated information frames for various video streaming applications and embedding them in the video transmitted by these applications. Notably, this restoration is achieved without modifying the behavior of the video streaming applications themselves. Consequently, the functionality of autostereoscopic display on computer devices is enhanced within a variety of video streaming applications.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be appreciated that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for end-to-end side-by-side image processing, comprising:
   a first computer device, running a video streaming application and a first program; and
   a second computer device, running the video streaming application and a second program;
   wherein the video streaming application causes the first computer device to transmit a video via a network to the second computer device and causes the second computer device to generate an edited image sequence based on the video;
   wherein the first program causes the first computer device to obtain a side-by-side image sequence;
   wherein the first program further causes the first computer device to determine position-and-range information of a non-side-by-side area in the edited image sequence in accordance with the video streaming application, and to generate an information frame based on the determined position-and-range information and a first side-by-side image in the side-by-side image sequence, wherein the generated information frame includes a header section and a corresponding specified image block, and the header section contains the position-and-range information, and the generated information frame is included in the video transmitted by the first computer device;
   wherein the second program causes the second computer device to parse the information frame to obtain the specified image block and the position-and-range information;
   wherein the second program further causes the second computer device to replace the non-side-by-side area in each edited image in the edited image sequence with the specified image block to generate an output image sequence; and wherein the second computer device displays the output image sequence on a display.

2. The system as claimed in claim 1, wherein the first program further causes the first computer device to represent the position-and-range information in the header section using an arrangement of image blocks in multiple colors, with each color representing a specific numerical value.

3. The system as claimed in claim 1, wherein the first program further causes the first computer device to generate the specified image block based on the first side-by-side image, in accordance with a scaling factor determined by the video streaming application.

4. The system as claimed in claim 1, wherein the first computer device obtains the side-by-side image sequence from a 3D camera.

5. The system as claimed in claim 1, wherein the first computer device further runs a third program which causes the first computer device to generate the side-by-side image sequence based on a 2D image sequence.

6. A method for end-to-end side-by-side image processing, implemented by a first computer device and a second computer device running a video streaming application, wherein the video streaming application causes the first computer device to transmit a video via a network to the second computer device, and causes the second computer device to generate an edited image sequence based on the video, the method comprising the following steps:

using the first computer device to obtain a side-by-side image sequence;

using the first computer device to determine the position-and-range information of a non-side-by-side area in the edited image sequence in accordance with the video streaming application, and to generate an information frame based on the determined position-and-range information and a first side-by-side image in the side-by-side image sequence, wherein the information frame includes a header section and a corresponding specified image block, and the header section contains the position-and-range information, and the information frame is included in the video transmitted by the first computer device;

using the second computer device to parse the information frame to obtain the specified image block and the position-and-range information;

using the second computer device to replace the non-side-by-side area in each edited image in the edited image sequence with the specified image block to generate an output image sequence; and displaying the output image sequence on a display.

7. The method as claimed in claim 6, wherein generating an information frame based on the determined position-and-range information and the first side-by-side image in the side-by-side image sequence further comprises:

representing the position-and-range information in the header section using an arrangement of image blocks in multiple colors, with each color representing a specific numerical value.

8. The method as claimed in claim 6, wherein generating an information frame based on the determined position-and-range information and the first side-by-side image in the side-by-side image sequence further comprises:

generating the specified image block based on the first side-by-side image, in accordance with a scaling factor determined by the video streaming application.

9. The method as claimed in claim 6, wherein obtaining the side-by-side image sequence further comprises:

obtaining the side-by-side image sequence from a 3D camera.

10. The method as claimed in claim 6, further comprising:

generating the side-by-side image sequence based on a 2D image sequence.

* * * * *